United States Patent
Zhao et al.

(10) Patent No.: US 10,770,066 B2
(45) Date of Patent: Sep. 8, 2020

(54) SLOT FILLING IN SPOKEN LANGUAGE UNDERSTANDING WITH JOINT POINTER AND ATTENTION

(71) Applicant: Robert Bosch GmbH, Stuttgart (DE)

(72) Inventors: Lin Zhao, Sunnyvale, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 16/057,521

(22) Filed: Aug. 7, 2018

(65) Prior Publication Data

US 2019/0371307 A1    Dec. 5, 2019

Related U.S. Application Data

(60) Provisional application No. 62/678,406, filed on May 31, 2018.

(51) Int. Cl.
 *G10L 15/197*  (2013.01)
 *G10L 15/22*   (2006.01)
 *G10L 15/16*   (2006.01)

(52) U.S. Cl.
 CPC .......... *G10L 15/197* (2013.01); *G10L 15/16* (2013.01); *G10L 15/22* (2013.01); *G10L 2015/223* (2013.01)

(58) Field of Classification Search
 None
 See application file for complete search history.

(56) References Cited

U.S. PATENT DOCUMENTS

| | | | |
|---|---|---|---|
| 10,339,919 B1* | 7/2019 | Raux | G10L 15/22 |
| 2017/0287478 A1* | 10/2017 | Schulz | G10L 13/08 |
| 2017/0337479 A1 | 11/2017 | Trischler et al. | |
| 2017/0351663 A1* | 12/2017 | Sordoni | G06F 40/30 |
| 2018/0060301 A1 | 3/2018 | Li et al. | |
| 2018/0067923 A1 | 3/2018 | Chen et al. | |
| 2018/0082171 A1* | 3/2018 | Merity | G06N 7/005 |
| 2019/0066668 A1* | 2/2019 | Lin | G10L 15/1815 |
| 2019/0244603 A1* | 8/2019 | Angkititrakul | G10L 15/1815 |

(Continued)

OTHER PUBLICATIONS

Liu, Bing, and Ian Lane. "Attention-based recurrent neural network models for joint intent detection and slot filling." arXiv preprint arXiv:1609.01454 (2016). (Year: 2016).*

(Continued)

*Primary Examiner* — Douglas Godbold
(74) *Attorney, Agent, or Firm* — Maginot, Moore & Beck LLP

(57) ABSTRACT

A method for slot-filling in an automated spoken language understanding (SLU) system includes receiving words in a text phrase, generating an encoded output and attention weights using a recurrent neural network (RNN) encoder with an attention mechanism, generating a first and second probability distributions of slot words in an extended slot vocabulary database using an RNN decoder and a pointer network, respectively, for a time step, generating a combined probability distribution based on the first and second probability distributions, and identifying a slot word corresponding to one word in the extended slot vocabulary database having a highest probability value in the combined probability distribution for the time step.

20 Claims, 3 Drawing Sheets

(56) References Cited

U.S. PATENT DOCUMENTS

2019/0385595 A1* 12/2019 Wabgaonkar ........ G06N 3/0445

OTHER PUBLICATIONS

Luong, T. et al., "Neural Machine Translation (seq2seq) Tutorial," retrieved from Internet Jul. 6, 2018: https://www.tensorflow.org/tutorials/seq2seq (30 pages).

Bahdanau, D. et al., "Neural Machine Translation by Jointly Learning to Align and Translate," 2014, arXiv preprint arXiv:1409.0473 (15 pages).

Rojas-Barahona, L M. et al., "Exploiting Sentence and Context Representations in Deep Neural Models for Spoken Language Understanding," Proceedings of COLING 2016, the 26th International Conference on Computational Linguistics: Technical Papers, pp. 258-267,2016 (10 pages).

Cho, K. et al., "Learning Phrase Representations using RNN Encoder-Decoder for Statistical Machine Translation," Proceedings of the 2014 Conference on Empirical Methods in Natural Language Processing (EMNLP), pp. 1724-1734, 2014 (11 pages).

He, S. et al., "Generating Natural Answers by Incorporating Copying and Retrieving Mechanisms in Sequence-to-Sequence Learning," Proceedings of the 55th Annual Meeting of the Association for Computational Linguistics, pp. 199-208, 2017 (10 pages).

Hemphill, C. T. et al., "The ATIS Spoken Language Systems Pilot Corpus," In Proceedings of the DARPA speech and natural language workshop, pp. 96-101,1990 (6 pages).

Henderson, M. et al., "Discriminative spoken language understanding using word confusion networks," In Spoken Language Technology Workshop (SLT), 2012 (6 pages).

Henderson, M. et al., "The Second Dialog State Tracking Challenge," Proceedings of the SIGDIAL 2014 Conference, pp. 263-272, 2014 (10 pages).

Henderson, M., "Discriminative Methods for Statistical Spoken Dialogue Systems," Ph.D. thesis, University of Cambridge, 2015 (168 pages).

Kingma, D. P. et al., "Adam: A Method for Stochastic Optimization," arXiv preprint arXiv:1412.6980, 2014 (15 pages).

Mesnil, G. et al., "Using Recurrent Neural Networks for Slot Filling in Spoken Language Understanding," IEEE/ACM Transactions on Audio, Speech, and Language Processing, vol. 23, No. 3, pp. 530-539, 2015 (10 pages).

Raymond, C. et al., "Generative and Discriminative Algorithms for Spoken Language Understanding," In Eighth Annual Conference of the International Speech Communication Association, 2007 (4 pages).

See, A. et al., "Get to the Point: Summarization with Pointer-Generator Networks," Proceedings of the 55th Annual Meeting of the Association for Computational Linguistics, pp. 1073-1083, 2017 (11 pages).

Vinyals, O. et al., "Pointer Networks," arXiv preprint arXiv:1506.03134v1, 2015 (9 pages).

Wang, S. et al., "Machine Comprehension Using Match-LSTM and Answer Pointer," arXiv preprint arXiv:1608.07905, 2016 (11 pages).

Williams, J. D., "Web-style ranking and SLU combination for dialog state tracking," Proceedings of the SIGDIAL 2014 Conference, pp. 282-291, 2014 (10 pages).

Yao, K. et al., "Recurrent Neural Networks for Language Understanding," In Interspeech, 2013 (5 pages).

Zhai, F. et al., "Neural Models for Sequence Chunking," arXiv preprint arXiv:1701.04027v1, 2017 (8 pages).

Zhou, D. et al., "Learning Conditional Random Fields from Unaligned Data for Natural Language Understanding," Advances in Information Retrieval, 2011 (6 pages).

Sutskever, I. et al., "Sequence to Sequence Learning with Neural Networks," arXiv:1409.3215v3, 2014 (9 pages).

"Introduction to pointer networks," FastML, retrieved from Internet Aug. 6, 2018: http://fastml.com/introduction-to-pointer-networks/, 2017 (7 pages).

* cited by examiner

SLOT FILLING IN SPOKEN LANGUAGE UNDERSTANDING WITH JOINT POINTER AND ATTENTION

CLAIM OF PRIORITY

This application claims the benefit of U.S. Provisional Application No. 62/678,406, which is entitled "Slot Filling in Spoken Language Understanding with Joint Pointer and Attention," and was filed on May 31, 2018, the entire contents of which are expressly incorporated herein by reference.

FIELD

This disclosure relates generally to the field of automated spoken language understanding and, more specifically, to systems and methods for using joint pointers and attention mechanisms in slot-filling in spoken language understanding system.

BACKGROUND

Unless otherwise indicated herein, the materials described in this section are not prior art to the claims in this application and are not admitted to the prior art by inclusion in this section.

Spoken Language Understanding (SLU) systems process language expressed by human speech into a semantic representation understandable by the machines. SLU is the key component of all conversational AI systems. The general tasks of SLU involve intent determination and slot filling from an utterance. The intent determination task can be considered as a semantic utterance classification problem, while the slot filling task can be tackled as a sequence labeling problem of contiguous words. Previous approaches to solving these two related tasks were typically proposed as two separated systems such as Support Vector Machines (SVMs) for intent determination and Conditional Random Fields (CRFs) for slot filling.

Recent advances in neural networks, especially recurrent neural networks (RNNs), allow joint training model of both intent determination and slot filling. This framework showed advantages over the previous state-of-the-art techniques, and has gained much attention in research community. The success of joint models is contributed by the attention mechanism and the encoder-decoder model. The attention mechanism allows optimized selection of input sequence for decoding for both content and location information.

In general, an SLU system is deployed as a downstream task of spoken dialogue systems where its inputs are outputs from the front-end Automatic Speech Recognition (ASR) engine. One of the tasks of an SLU system is to assign words that the ASR recognizes in the input speech of a user to slots in a slot-filling operation. As used herein, the term "slot" refers to a machine-understandable data field that is filled with one or more input words in natural language input in the SLU system. For example, one set of spoken language input to a home automation system requests activation of a heater. The input includes multiple slots including a command slot, a slot that indicates the type of device to be activated (e.g. a heater), and another slot includes a setting for the device (e.g. set the temperature to 40° C.). Once assigned to a slot, an automated system uses the input words for each slot to perform additional operations, such as operating components in a home automation system using the example provided above.

The aforementioned example uses a set of enumerable slots in which there are a well-defined number of valid inputs for each slot in a given system (e.g. well-defined sets of valid commands, automation devices, and valid numeric temperature values), but not all SLU systems can operate with slots that have a well-defined set of enumerable values. Some prior-art SLU systems use machine learning classifiers that are trained using annotated training data to recognize the slots for different words in spoken language input. However, these prior-art SLU systems can have difficulty in performing the slot-filling operation when slots can be filled with words that are not well represented in or entirely absent from the original training data. First, some types of slots may have a large or even unlimited number of possible values, so the classifiers may suffer from the data sparsity problem because the available set of training data is often limited and even large sets of training data cannot classify a large portion of the correct inputs for some types of slots. Another problem is produced by out-of-vocabulary words caused by unknown slot values (e.g., restaurant and street names), which are not practical to predefine in the training data and that are very common in real-world spoken dialogue applications. Consequently, improvements to methods and systems that increase the accuracy of spoken language understanding systems would be beneficial.

SUMMARY

To address the challenges with the prior-art SLU systems, the embodiments described herein present a neural generative model for slot filling using unaligned dialogue data, specifically for slot value prediction as it has more challenges caused by OOV word. The model uses Seq2Seq learning to predict a sequence of slot values from an utterance. Inspired by the ability of pointer network (Ptr-Net) at addressing OOV problems, we incorporate Ptr-Net into a standard Seq2Seq attentional model to handle OOV slots. The embodiments described herein can predict slot values by either generating one from a fixed vocabulary or selecting a word from the utterance. The final model is a weighted combination of the two operations.

The embodiments described herein use a neural generative model for slot filling on the data without word-level annotations. The embodiments described herein use a pointer network to handle the OOV problem in slot value prediction, which achieves improved performance over the prior-art without requiring manually-designed rules or features.

A spoken language understanding (SLU) system receives a command or query in natural language from a user and outputs the intents and slots that are identified in the user input. The SLU system identifies words for slots by using a sequence-to-sequence neural network and a pointer network jointly, in order to specifically handle the out-of-vocabulary problems in many spoken dialogue applications. The system further identifies the user intent and types of slots using convolutional neural networks. The identification of slot values and user intent types can be conducted either in a pipeline or joint framework.

In one embodiment, a method for operation a spoken language understanding (SLU) system includes receiving, with a processor in the SLU system, a plurality of words in a text phrase, generating, with the processor, an encoded output corresponding to the plurality of words and a plurality of attention weights corresponding to the plurality of words using a recurrent neural network (RNN) encoder with an attention mechanism that receives the plurality of words as inputs to the RNN encoder, generating, with the processor, a first probability distribution corresponding to a plurality of words in an extended slot vocabulary database being a slot word at a time step using an RNN decoder that receives the encoded output from the RNN encoder as input, generating, with the processor, a second probability distribution corresponding to the plurality of words in the input sequence being a slot word at the time step using a pointer network that receives the plurality of attention weights as input, generating, with the processor, a combined probability distribution based on the first probability distribution and the second probability distribution, identifying, with the processor, a slot word corresponding to one word in the extended slot vocabulary database having a highest probability value in the combined probability distribution for the time step, and performing, with the processor, a command using the slot word as a parameter to the command.

In another embodiment, a system for spoken language understanding (SLU) has been developed. The system includes a input device, an output device, a memory, and a processor operatively connected to the input device, the output device, and the memory. The processor is configured to receive a plurality of words in a text phrase based on an input received with the input device, generate an encoded output corresponding to the plurality of words and a plurality of attention weights corresponding to the plurality of words using a recurrent neural network (RNN) encoder with an attention mechanism stored in the memory that receives the plurality of words as inputs to the RNN encoder, generate a first probability distribution corresponding to a plurality of words in an extended slot vocabulary database stored in the memory being a slot word at a time step using an RNN decoder stored in the memory that receives the encoded output from the RNN encoder as input, generate a second probability distribution corresponding to the plurality of words in the input sequence being a slot word at the time step using a pointer network that receives the plurality of attention weights as input, generate a combined probability distribution based on the first probability distribution and the second probability distribution, identify a slot word corresponding to one word in the extended slot vocabulary database having a highest probability value in the combined probability distribution for the time step, and perform a command using the slot word as a parameter to the command to produce an output with the output device.

DETAILED DESCRIPTION

Figure 1:
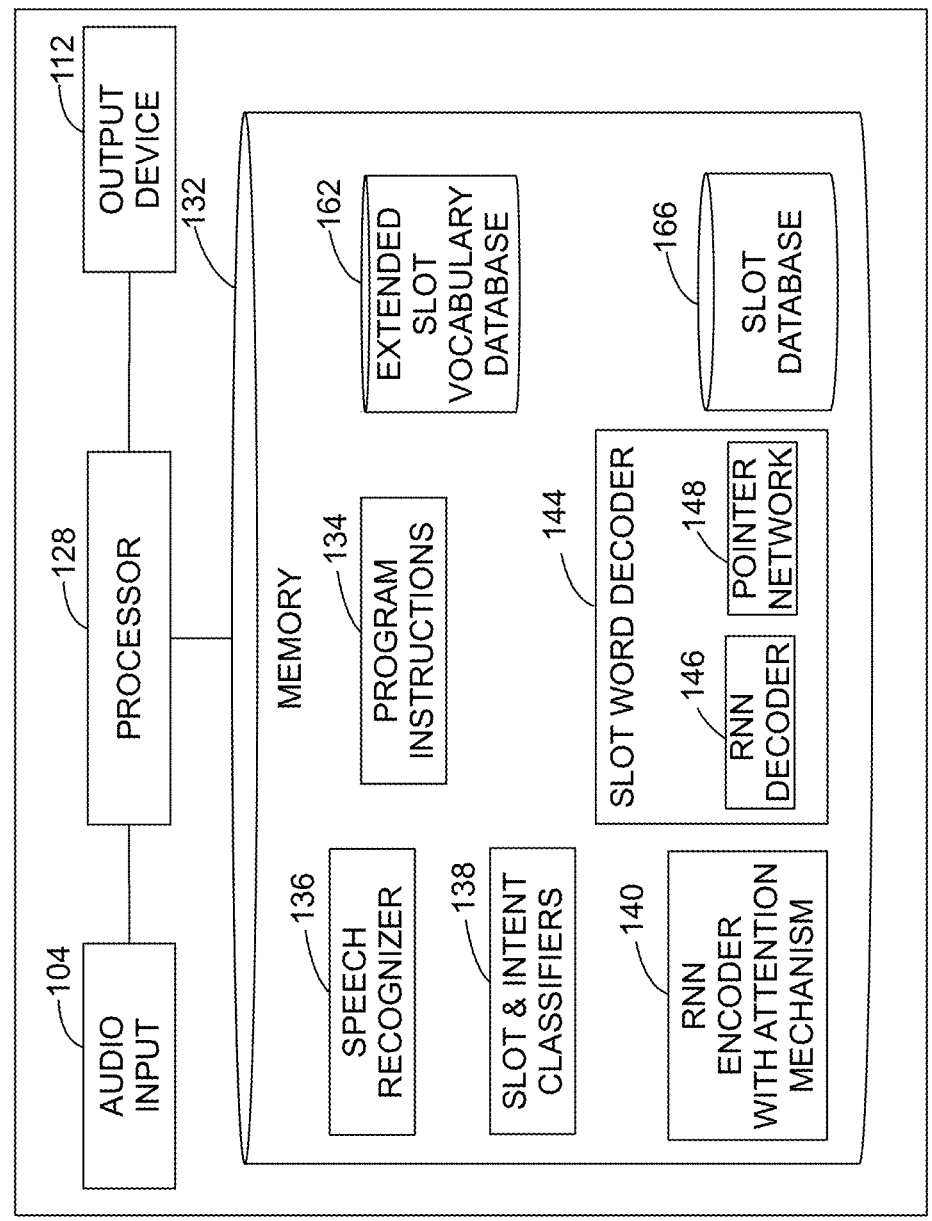
FIG. 1 is a schematic diagram of one embodiment of an automated spoken language understanding (SLU) system.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term Recurrent Neural Network (RNN) refers to a type of neural network that receives a series of inputs and generates a series of outputs in which each input to the RNN affects the internal state of the RNN to provide the RNN with a "memory" in which the output of the RNN is affected not only by the present input but on the internal state of the RNN that has been changed based on previously received inputs. Different types of RNNs include neurons that employ a gated recurrent unit (GRU), a long short-term memory (LSTM) unit, or other units that are known to the art in which each "unit" is also referred to as a neuron in an RNN. In an RNN encoder/decoder network, an encoder includes one or more units that receive a sequence of inputs and generate an encoded output, which is typically in the form of a numeric vector or other suitable structure, which includes encoded information about each of the inputs in the sequence. In the embodiments described herein, the sequence of inputs refers to numeric values that map to words in an input sequence. The encoder retains an internal "hidden state" h that is updated for each input in the sequence, which is modeled as a series of time steps t in which the RNN encoder receives an additional input in each time step. The final output of the encoder includes encoded information about all of the inputs that were received in the sequence.

In the RNN encoder/decoder network, the decoder is another RNN that receives the encoded output vector corresponding to the final hidden state h from the RNN encoder as an input. The RNN decoder emits a sequence of outputs, which in the specific embodiments described herein are probability distributions $P_{gen}$ of different words in a predetermined slot vocabulary, which may include words that are not in the original input, correspond to a slot during a sequence of time steps. Thus, the RNN encoder/decoder network emits a sequence of words that should be applied to slots, and a separate mechanism then uses the joint output of the RNN decoder and the pointer network that is described below to fill in slots with the generated words during an SLU operation. The process also filters words from the plurality of words in a text phrase of the original input sequence that do not correspond to any of the slots. As described above, one drawback of a conventional RNN decoder is that the training process is less effective in identifying out-of-vocabulary (OOV) words that might correspond to slots but that are not well represented in the training data. In the context of this disclosure, OOV means that a word can be identified by an automated speech recognition front-end, but that the word is not directly assignable to an enumerable slot that has a predetermined number of possible inputs that are included in the original training data. By contrast, words that can be assigned to enumerable slots and that are included in the training data are referred to as "in-vocabulary" words.

The embodiments described herein use both uni-directional and bi-directional RNNs. A uni-directional RNN incorporates one or more neurons to generate a series of outputs based on a series of input values going in one direction in time, which is usually although not exclusively from the earliest input in a sequence to the latest input in a sequence. Some RNNs use multiple layers of neurons although the embodiments described herein can be implemented with a single layer or multiple layers of neurons. A bi-directional RNN includes at least two neurons, such as two instances of the GRU, to generate outputs going both forwards in time and backwards in time. For the embodiments described herein, all of the input data are available prior to using the RNNs so going "backwards" in time simply means that one neuron or set of neurons in the RNN starts from the final value in the input and iterates backwards to the first input value to incorporate hidden state and context information from future values in the sequence instead of previous values in the sequence, which is effectively the configuration of a forward-time RNN that is reversed in time. Another neuron or set of neurons in the RNN generates an output starting from the earliest input in the sequence in a similar manner to the uni-directional GRU. The output of the bi-directional RNN is, for example, a combination of two vectors that are based on the numeric hidden state variable outputs for both the forward and backward direction RNNs to produce an output for each input value in the sequence that is influenced by both previous values and subsequent values in the sequence.

As described above, in a standard RNN the encoder generates a single output vector that encodes information about all of the inputs in a sequence. As used herein, the term "attention mechanism" refers to an additional process that enables an RNN encoder/decoder to include additional information about the positions of words in the sequence that is not directly encoded into the output vector of the RNN encoder. The attention mechanism generates multiple numeric attention weight values based on a score function of two different hidden states. Examples of score functions include $score(h_t, \bar{h}_s) = h_t^T W \bar{h}_s$ or $score(h_t, \bar{h}_s) = v_a^T \tanh(W_1 h_t + W_2 \bar{h}_s)$ where the term $h_t$ is the vector of a decoder hidden state at the current time step t, $\bar{h}_s$ is the vector of the s-th encoder hidden state in the sequence, and the terms $v_a$, $W$, $W_1$, and $W_2$ represent numeric weight parameters that are learned during training of the RNN encoder/decoder framework. More generally, the score function calculates the score at decoder time step t based on the correlation between the encoder hidden state and decoder hidden state, thus obtains the focus or "attention" to different words in an input sequence. In one embodiment, the RNN encoder uses an attention mechanism to produce numeric attention weight values $a_{ts}$ based on the scores using the following function:

$$a_{ts} = \frac{e^{(score(h_t, \bar{h}_s))}}{\sum_{s=1}^{S} e^{score(h_t, \bar{h}_s)}}$$

for a total of S source hidden states. The attention mechanism uses the attention weights to generate a context vector c and an attention vector $a_t$ using, for example, the following functions: $c_t = \sum_s a_{ts} \bar{h}_s$ and $a_t = f(c_t, h_t) = \tanh(W_c[c_t; h_t])$ where $W_c$ is another weight value. Other embodiments of attention mechanism that employ feed-forward neural networks to determine the attention scores are also known to the art. The RNN decoder can use the output of the attention mechanism in addition to the standard output vector of the RNN encoder to improve the accuracy of generating decoded outputs by using the attention scores that correspond to the sequence of words in the original input to focus on different input words when generating a sequential output.

As used herein, the term "pointer network" refers to a decoder mechanism that can be used to select an input element in a sequence, such as a word from a sequence of words, in a decoder based on the attention scores that are generated in an RNN encoder. At each decoding step, the pointer network selects a position from the input sequence based on the attention distribution instead of generating a token from the target vocabulary. For example, a pointer network receives an input sequence $X = \{x_1, \ldots, x_T\}$, and generates an output $y_t$ at time step t based on the following function: $P_{ptr}(y_t = w | y_1^{t-1}, X) = \sum_{i: x_i = w} a_i^t$, where w is an input word, $a_i^t$ is the attention weight of the position i at step t. The value of $P_{ptr}$ is a probability distribution of words, including in-vocabulary and out-of-vocabulary words, that are generated by the pointer network at each decoder time step t where each time step corresponds to one word in the output sequence Y. The embodiments described herein combine the output of the RNN decoder and the output of the pointer network to identify slot words from the input based on an extended vocabulary, where once again the slot words do not necessarily have to be present in the original input. As used herein, the term "extended vocabulary" denotes the union of the slot vocabulary (in-vocabulary words) for enumerable slots that are well-represented in the training data and other words from the input utterances, which further include out-of-vocabulary words.

FIG. 1 depicts a spoken language understanding (SLU) system 100 that identifies slot words including both in-vocabulary and out-of-vocabulary words for slot-filling operations. The system 100 includes an audio input device 104, an output device 112, a processor 128, and a memory 132. Examples of hardware embodiments that implement the system 100 include, for example, an in-vehicle information system, personal computer, mobile electronic device such as a smartphone or wearable computing device, and the like. While the system 100 is depicted as a single computing device for illustrative purposes, in some embodiments the system 100 includes a client device that receives input via the an audio input device 104, generates output via the output device 112, and transmits recorded audio data or the output of an automated speech recognition system that is implemented in the client to an external server computing system via a data network. The external server computing system then performs additional processing to identify the slots and transmits a final output to the client computing device. In either embodiment, a reference to the operation of a processor, such as the processor 128, refers interchangeably to the operation of a single processor in a computing device or multiple processors in multiple computing devices that interoperate with each other to implement the functions described herein.

In the system 100, the audio input device 104 is, for example, a microphone or a series of microphones that receive spoken input from a human user. The audio input device 104 optionally includes additional circuits including filters, amplifiers, and analog-to-digital converters that produce audio data of a digitized representation of the input speech for additional processing by the processor 128. While FIG. 1 depicts an audio input device 104, alternative embodiments use another input device that enables the system 100 to receive a series of words corresponding to human input, such as a keyboard or gesture input device.

In the system 100, the output device 112 is, for example, an audio output device or visual display device that produces an output in a dialogue system. The output is based, at least in part, on information provided to the system 100 from the user via the audio input device 104. As described in more detail below, the system 100 receives speech or text input from a user, encodes the input, and performs a slot-filling operation to assign slots to at least some of the words in the original input. The system 100 processes the slots with particular terms that are understandable in a spoken language understanding framework to produce an output response based on the input from the user. The output device 112 provides an output to the user that mimics a dialogue response expected by the user based on the input from the user, but the system 100 generates the dialogue response in an automated manner.

In the system 100, the processor 128 is a digital logic device including, for example, one or more of a microprocessor central processing unit (CPU), microcontroller, digital signal processor (DSP), field programmable gate array (FPGA), graphical processing unit (GPU), application specific integrated circuit (ASIC), or any other suitable digital logic devices that perform the functions and actions of the system 100 that are described herein. In some embodiments, the processor 128 includes acceleration hardware that implements the operations of the RNN encoders and decoders described herein in an efficient manner, although other processing hardware including CPUs and GPUs can implement the RNN encoders and decoders as well. The processor 128 is operatively connected to the audio input device 104, the output device 112, and the memory 132.

In the system 100, the memory 132 includes one or more volatile memory devices such as random access memory (RAM) and one or more non-volatile memory devices such as a magnetic or solid state disk. The memory 132 stores programmed instructions 134 and data that implement a speech recognizer 136, an intent classifier 138, an RNN encoder 140 that includes an attention mechanism, a slot word decoder 144 that further includes an RNN decoder 146 and a pointer network 148, an extended slot vocabulary database 162, and a slot database 166.

In the memory 132, the speech recognizer 136 is a prior-art automated speech recognition (ASR) engine that includes, for example, software and models that convert the audio data that the system 100 receives from the audio input device 104 into a sequence of machine-readable representations of the words in the text phrase. The ARS 136 includes any suitable embodiment of an automated speech recognition system including those using Hidden Markov Models, and various types of neural networks including "deep learning" neural network models. The system 100 uses the speech recognizer 136 to generate a sequence of text words that serve as a basis for the remainder of the spoken language understanding processing that is described herein.

In the memory 132, the slot and intent classifiers 138 are neural networks that recognize the slots and intents of the input sequence of text from the user. In one embodiment the slot and intent classifiers 138 are convolutional neural networks (CNN). In another embodiment the intent classifier 138 is an RNN decoder that can receive the output of the RNN encoder 140 and that is jointly trained with the RNN encoder 140. The term "intent" as known in the art refers to an intended command or query that is recognized by an SLU system based on the input from the user. One example of an intent is a request for a navigation system to identify restaurants based on elements of a user query, where specific elements in the user query provide words that correspond to slots in the query. The slot classifier 138 receives the slot words that the system 100 generates during the process 300 that is described in further detail below, and the process 300 provides words that have a high probability of corresponding to slots in an SLU operation without requiring the slot classifier 138 to process each word of the original input, which in turn improves the accuracy of slot classification. In some embodiments, the slot classifier also receives an intent identifier as an input from the intent classifier in addition to the slot word, which provides context to enable the slot classifier 138 to identify a slot in the slot database 166 for slot words with greater accuracy.

In the memory 132, the RNN encoder 140 is an RNN that receives a sequence of numeric values that correspond to words in an input sequence and generates a first encoded representation of the plurality of words as a first vector of hidden state numeric output values h based on the inputs. The processor 128 also implements the RNN encoder 140 using an attention mechanism that produces the attention weights described above. In the embodiment of FIG. 1 the RNN encoder 140 is a bi-directional RNN encoder that is implemented using at least two GRUs although in other embodiments the RNN encoder can be a uni-directional encoder.

In the memory 132, the slot word decoder 144 emits a sequence of slot words as output based on words in an input sequence using both the hidden state encoded output and the attention weights from the RNN encoder 140. The term "slot word" refers to a word in the extended slot vocabulary database 162 that the slot word decoder 144 generates at each time step of a decoding sequence to serve as inputs to the slot classifier 138. A slot word may be a word that is present in the original input sequence, but the slot word decoder 144 may also emit slot words that are not present in the original input sequence. Additionally, in some situations the slot decoder 144 does not emit words from the original input sequence as slot words.

The slot decoder 144 includes an RNN decoder 146 and a pointer network 148. In the embodiment of FIG. 1, the RNN decoder 146 is a uni-directional decoder that is implemented as an RNN with at least one GRU. The RNN decoder 146 uses the final hidden state of the RNN encoder 140 as input and optionally uses attention vector from the attention mechanism of the RNN encoder 140 to improve the accuracy of output. The RNN decoder 146 emits a series of probability distributions for the most likely in-vocabulary slot words that are contained in the extended slot vocabulary database 162. In some embodiments, the RNN decoder 146 also uses the output of the attention mechanism of the RNN encoder 140 to enable the RNN decoder 146 to use the attention vector to generate the probability distribution of in-vocabulary slot words. The outputs of the RNN decoder 146 generate probability distributions with potentially non-zero probability values for words that have enumerable in-vocabulary words stored the extended slot vocabulary database 162, and the output of the RNN decoder 146 may include high probability values for in-vocabulary words that are not present in the original input.

The pointer network 148 receives the attention weights from the attention mechanism 140 of the RNN encoder 140 as inputs and generates another probability distribution of slots that are assigned to each word in the input sequence. The outputs of the pointer network 148 generate probability distributions with the highest probability values for slot words that are stored as out-of-vocabulary words in the extended slot vocabulary database 162 and that are present in the original input sequence of words, but that are not generally recognized with high accuracy by the RNN decoder 146. The final output from the slot word decoder 144 is a combination of the outputs of the RNN decoder 146 and the pointer network 148 that provides one or more slot words. The slot word decoder 144 provides an "extended vocabulary" since the slot word decoder 144 generates the slot words using a combined probability distribution for both in-vocabulary and out-of-vocabulary slot words. The system 100 or another automated spoken language system uses slot words to fill one or more slots as part of additional dialogue processing.

In the memory 132, the extended slot vocabulary database 162 stores the extended vocabulary of all words and numerical values that includes both in-vocabulary words that can be assigned to enumerable slots and that are well represented during the training process as well as out-of-vocabulary words that can be recognized by the ASR 136 but that are not well represented during the training of the RNN encoder 140 and the slot word decoder 144. As such, the precise set of words contained in the extended slot vocabulary database 162 depends upon the total corpus of recognized words that the system 100 is configured to process and since the extended slot vocabulary database 162 includes the extended vocabulary, the extended slot vocabulary database 162 includes both "in-vocabulary" words that are well represented in the training of the RNN encoder 140 and RNN decoder 146 as well as "out-of-vocabulary" words that are not well represented during the training process. During operation of the system 100, the RNN decoder 146 in the slot word decoder 144 uses the hidden state h received from the RNN encoder 140 to identify in-vocabulary words in the extended slot vocabulary database 162 that correspond to slots with the highest probability and the pointer network 148 to identify out-of-vocabulary words that correspond to slots with the highest probability.

In the memory 132, the slot database 166 stores a set of predetermined slot labels that correspond to the outputs of the slot classifier 138 when the slot classifier 138 is provided with slot word inputs. The slot database 166 also stores a default NULL value slot that serves as a catch-all identifier for a slot word that does not directly correspond to a specific slot. For example, in one configuration the slot word decoder 144 generates an output sequence of slot words that may correspond to one of the slots in the slot database 166. The slot classifier 138 receives the words and generates an output with a probability distribution of elements that map to index values of different slots in the slot database 166. The processor 128 can identify the slot that is assigned to a slot word using the slot database 166. The system 100 then uses the slot word in conjunction with the slot to perform further processing, such as formulation of a database query with different fields in the database query filled with words that correspond to the slots in the slot database 166. The exact values of slots in the slot database 166 can vary based on the domain for which the SLU system 100 is trained to provide interaction with a user, and as a non-limiting example one domain is an in-vehicle navigation system that receives requests for various landmarks including restaurants or locations to which a vehicle may travel. The slot database 166 is generated prior to a training process and used in conjunction with the training process of the RNN encoder 140 and the slot word decoder 144 to generate outputs that correspond to the slots in the slot database 166.

In one example, the system 100 is configured to perform SLU operations for an in-vehicle navigation system. A predetermined set of training data provides predetermined text phrases and a correspond set of predetermined slots that correspond to words in the text training phrases. The result of the training process is a set of parameters that adjust the GRUs or other neurons in the RNN encoder 140 and the slot word decoder 144 to enable the encoder 140 and decoder 144 to assign slots to words in the input text based on the training data when the RNN encoder 140 with the attention mechanism and the slot word decoder 144 with the RNN decoder 146 and pointer network 148 are used together in the joint model that is described herein. Since the training data are selected to be representative of actual inputs that are expected to be received during operation of the system 100, the trained RNNs also have a high likelihood of producing accurate outputs when presented with another sequence of input text and in-vocabulary terms that are present in the training data. The pointer network improves the operation of the system 100 in performing slot-filling operations when out-of-vocabulary words are present in the input, and the training process assigns weights to the pointer network. Additionally, the training process uses hyperparameters that are defined prior to commencement of the training process that define various parameters for training the RNN encoder and decoders including hyperparameters that specify a learning rate, minibatch size (used in minibatch gradient descent training processes that are otherwise known to the art), and dropout rate. As known in the art, the GRUs use sigmoid functions that can include a trainable parameter a:

$$\frac{1}{1+e^{-ax}},$$

and the training process assigns values to weights and parameters in the RNN encoder/decoder, attention mechanism, and the pointer network. In the system 100, the memory 132 stores the parameter data, weights, and other data structures that implement the slot and intent classifiers 138, RNN encoder 140, and slot word decoder 144 prior to the inferencing operation of the process 300 that is described in more detail below.

Figure 2:
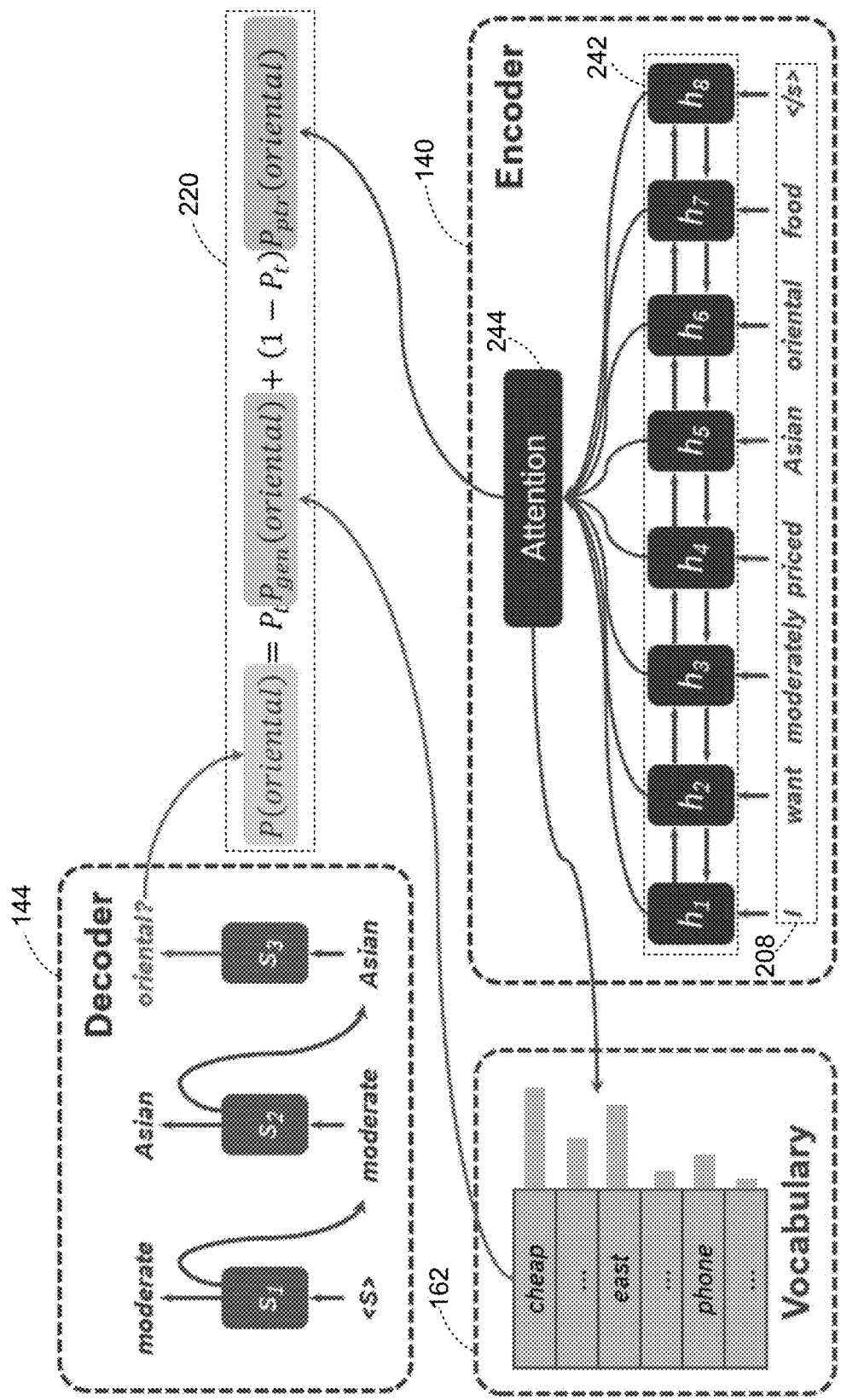
FIG. 2 is a schematic diagram of the embodiment of FIG. 1 while performing a slot-filling operation for a sequence of words in a text phrase.
Figure 3:
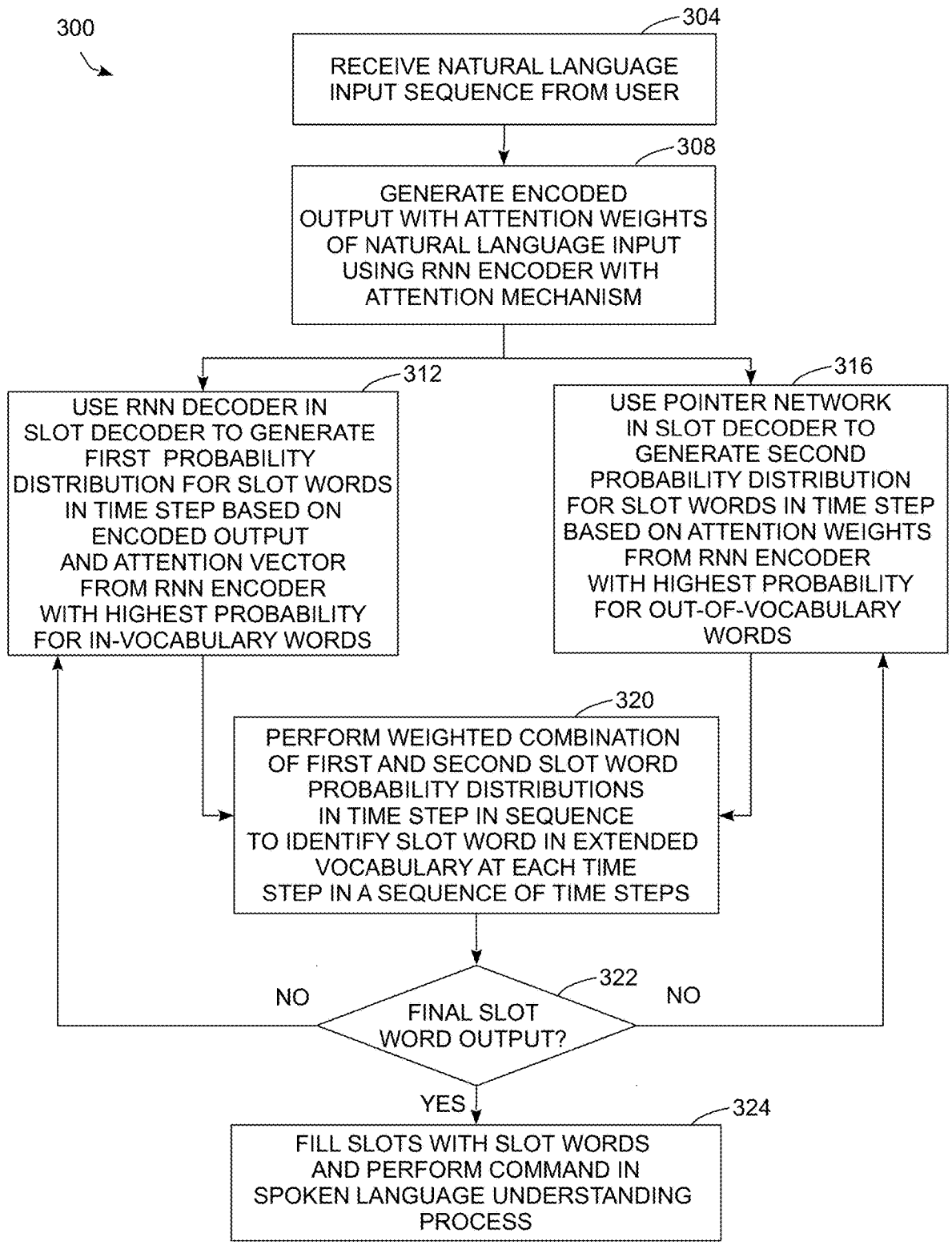
FIG. 3 is a block diagram of a process for identifying slot words and using the slot words in an SLU system.

FIG. 3 depicts a process 300 for operation of a spoken language understanding (SLU) system that processes the output of a speech recognizer to perform a slot-filling operation. The process 300 is also referred to as an inferencing process because the process 200 uses previously trained RNN encoders and decoders along with the attention mechanism and pointer networks in the system 100 to perform slot filling as part of an SLU system. In the description below, a reference to the process 300 performing a function or action refers to the operation of a processor to execute stored program instructions to perform the operation in conjunction with components in an automated spoken language understanding system. For example, the description below includes descriptions of an RNN encoder, attention mechanism, RNN decoder, and a pointer network that refer to operations performed by a processor to execute stored program instructions in conjunction with data structures of the RNN encoders and decoders that are stored in a memory to implement the RNN encoder or decoder. The process 300 is described in conjunction with the embodiments of FIG. 1 and FIG. 2 for illustrative purposes.

The process 300 begins as the system 100 receives an input sequence including a plurality of words in a text phrase from a human user (block 304). In the system 100, the processor 128 uses the automated speech recognizer 136 to generate a sequence of words in the text phrase based on input that is received from the audio input device 104. In another embodiment, the input may be a free-form text phrase that the user enters with a keyboard or gesture input device. As described above, while the output of the automated speech recognition process can identify a sequence of words in a machine-readable format, the spoken language understanding system requires additional processing to identify words in the extended slot vocabulary database 162 that correspond to slots based on the input sequence.

The process 300 continues as the system 100 generates an encoded output with attention weights of the natural language using the RNN encoder with attention mechanism 140

(block 308). The processor 128 uses the trained RNN encoder 140 to generate both the encoded vector output based on a forward-direction and backwards-direction RNN encoder that uses at least two GRUs and the attention mechanism to generate attention weights for each word in the original input sequence of the text phrase. FIG. 2 depicts the operation of the encoder 140 with the bi-directional RNN 242 and the attention mechanism 244 for a sample input sequence of words in a text phrase 208 in more detail.

During the process 300, the system 100 uses the RNN decoder 146 in the slot word decoder 144 to generate a first series of probability distribution outputs that identify the most likely word or words that correspond to any slot during each time step in a sequence of time steps (block 312). The processor 128 uses the encoded output of the final hidden state h from the RNN encoder 140 as the input to the RNN decoder 146. As described above, the RNN decoder 146 produces outputs that provide probability distribution values for the in-vocabulary words that are stored in the slot vocabulary database 162, although the RNN decoder 146 generates a sequence of outputs based on the encoded input from the RNN encoder 140 that encodes information about all of the words, both in and out-of-vocabulary, in the input sequence. In some embodiments, the RNN decoder 146 also uses the attention vector from the attention mechanism of the RNN encoder 140 as an input to improve the accuracy of predicting slot words. In some embodiments, the probability output of the RNN decoder 146 is zero at each time step in the output sequence for out-of-vocabulary words while the RNN decoder 146 can produce non-zero probability distribution values for one or more of the in-vocabulary words that are stored in the extended slot vocabulary database 162.

During the process 300, the system 100 also uses the pointer network 148 in the slot word decoder 144 to generate a second series of probability distribution outputs that each predict a probability distribution of potential slot words in the input sequence during a time step based on the attention weights from the attention mechanism of the RNN encoder 140 (block 316). The processor 128 uses the pointer network 148 to generate the probability distribution for slot values of each word based on the attention weight values for each input word in the sequence and the current time step. FIG. 2 also depicts the operation of the slot word decoder 144 including the pointer network 148 in more detail for the portion of the words in the input sequence 208 including the out-of-vocabulary word "oriental," which is present in the original input sequence 208 and is an out-of-vocabulary word in the example of FIG. 2. The pointer network 148 produces a probability distribution output for words in the original input sequence, each word of which is also present in the extended slot vocabulary database 162. The pointer network 148 can produce a probability distribution for both in-vocabulary and out-of-vocabulary slot words that are present in the input sequence, although the system 100 uses the pointer network 148 most heavily for identifying out-of-vocabulary slot words while relying more heavily on the RNN decoder 146 to identify in-vocabulary slot words.

The process 300 continues as the system 100 uses a weighted combination of the outputs of the RNN decoder 146 and the pointer network 148 to identify a slot word at each time step (block 320). To combine the outputs, the processor 128 generates a probability distribution over the extended vocabulary based on the following function: $P(w) = p_t P_{gen}(w) + (1 - p_t) P_{ptr}(w)$, where w is one word selected from the total set of W words in the extended slot vocabulary database 162. FIG. 2 depicts this operation applied to the word "oriental" in the sequence 220 of FIG. 2. In the preceding equation, the term $P_{gen}(w)$ refers to the probability distribution value for the word w that the RNN decoder 146 generates for a given word w and the term $P_{ptr}(w)$ refers to the probability distribution value for the word w that the pointer network 148 generates for the same word w.

In the weighted combination of the process 300, the $p_t$ term is a weight value that has a range of $p_t \in [0,1]$ and that is defined as $p_t = \sigma(w_c c_t + w_s s_t + w_d d_t + b)$ where σ is a sigmoid function, $d_t$ is the input to the slot word decoder 144 at time step t, $c_t$ is a context vector of the attention mechanism at time step t, $s_t$ is a hidden state of the RNN decoder 146 at time step t, the terms $w_c$, $w_s$, and $w_d$ are each trainable weight values that are part of the pointer network in the slot word decoder 144, and b represents a bias term, which is a scalar parameter, learned during training together with $w_c$, $w_s$, and $w_d$. The processor 128 generates the weight value $p_t$ and uses the $p_t$ weight value to generate a weighted sum of $P_{gen}$ and $P_{ptr}$ to balance the relative contributions of the RNN decoder 146 and the pointer network 148. More particularly, the $p_t$ value is based on the RNN decoder 146, and a higher weight value of $p_t$ indicates a that the output of the RNN decoder 146 is favored for in-vocabulary words while a lower value of $p_t$ indicates that the output of the pointer network 148 is favored for out-of-vocabulary words. As described above, the value of $p_t$ changes over a sequence of time steps t to provide varying weight values to the output of the RNN decoder 146 or the pointer network 148. The processor 128 identifies the slot word for each time step using, for example, the word in the extended slot vocabulary database 162 that has the highest probability value in the combined probability distribution P (W) of all the words W that represents the highest slot word probability of all the words in the extended slot vocabulary database 162 from the combination of both probability distributions from the RNN decoder 146 and the pointer network 148.

Referring to FIG. 2, the equation 220 depicts the weighted sum combination of the outputs of the RNN decoder 146 and the pointer network 148 in the slot word decoder 144 to generate a combined probability distribution with an entry that corresponds to the word "oriental" (P(oriental)). In FIG. 2 the processor 128 assigns a weighted balance to the output $P_{ptr}$ of the pointer network 148 for out-of-vocabulary word "oriental" relative to the output of the RNN decoder 146 using the function $p_t$ at the time step t. In the embodiment of the system 100, the output of $P_{gen}$ (oriental) from the RNN decoder 146 is zero for the out-of-vocabulary word "oriental", although the probability values for in-vocabulary words are non-zero, and the value of $p_t$ at each time step affects final probability distribution value for the word "oriental" in addition to the output $P_{ptr}$ from the pointer network 148. The combined result P(w) is included in the probability distribution of slot words that the processor 128 uses to select a slot word for each time step based on the highest probability value in the combined probability distribution. The processor 128 then assigns a slot label from the slot database 166 to one or more slot words with the slot classifier 138. During the process 300, the system 100 generates the sequence of slot words based on the combined outputs of the RNN decoder 146 and the pointer network 148 at each time step in the sequence as is described above.

As described above, the process 300 generates a sequence of slot words over a series of time steps in which both the RNN decoder 146 and the pointer network 148 produce different slot word probability distributions for each time step. The process 300 continues as described above for at least one and potentially more than one time step (block 322)

until reaching the final slot word output at a final time step from either or both of the RNN decoder 146 and the pointer network 148. After the final slot word output is generated (block 322), the system 100 uses the slot words as an input to additional SLU processing that is described below. In one embodiment, the slot word decoder 144 stops emitting slot words after either emitting a predetermined end symbol as a slot word (e.g. </s> as depicted in FIG. 2) or after emitting a predetermined maximum number of slot words, such as ten slot words, without emitting the end symbol.

Table 1 below depicts some examples of predicted slot words that are generated from sequences of words in text phrase inputs using the slot-filling process 300 and using prior-art processes including a convolutional neural network (CNN) and the Seq2Seq RNN encoder/decoder framework that uses an attention model. As seen below, the process 300 can identify a single slot word or multiple slot words from an input phrase that includes at least one word that corresponds to a slot. The bolded text in each input represents the slot words that should be filled into one or more slots using a slot classifier, where the slots pertain to a characteristic of a restaurant such as the type, location, or price of the restaurant. In the table below, the identified slot words can be present in the original input or may be identified as a word in the extended vocabulary that is not present in the original input.

TABLE 1

Examples of predicted text values for slots

Input: Danish food in the centre of town

| System 100 | Seq2Seq (prior art) | CNN (prior art) |
|---|---|---|
| Danish centre | Spanish centre | Centre |

Input: I would like Singaporean food

| System 100 | Seq2Seq (prior art) | CNN (prior art) |
|---|---|---|
| Singaporean | Korean | NULL (not found) |

Input: what about Chiquito

| System 100 | Seq2Seq (prior art) | CNN (prior art) |
|---|---|---|
| Chiquito [name of restaurant] | Portuguese | NULL (not found) |

Input: an expensive restaurant serving Cantonese food

| System 100 | Seq2Seq (prior art) | CNN (prior art) |
|---|---|---|
| Cantonese | Portuguese expensive | expensive |

The process 300 continues as the system 100 performs a command specified in the input phrase from the user using words the identified slots as parameters for execution of the command (block 324). In some configurations, in addition to identifying the slots for words in the input sequence, the processor 128 uses the intent classifier 138 to identify the intent of the input phrase, and the system 100 performs an operation based on the identified intent using specific slot words and the identified slots as parameters to the operation. Using the input text phrase 208 from FIG. 2 as a non-limiting example, the system 100 identifies the intent as an input request from a user to display restaurants with certain characteristics. The slot word generation process produces probability values at each time step in a sequence of time steps that identify the probability that any word in the extended vocabulary database 162 is a slot word, including both in-vocabulary and out-of-vocabulary words. As described above, the system 100 may generate slot words that are not present in the original input text phrase based on the weighted output of the slot word decoder 144, and words that are present in the original input text phrase may be omitted from the generated slot words. After generating slot words, the processor 128 uses the slot classifier 138 to identify the particular slot for one or more of the slot words, and the slot classifier 138 does not need to process the original input text, which as described above often includes words that do not correspond to a slot.

During, the process 300, the processor 128 uses the slot words that are assigned to specific slots to execute a command such as, for example, a search query to an external database to search for restaurants that meet the criteria of the input and controls the output device 112 to produce an output in response to performing the command that uses the slot words as parameters. In one particular example, the system 100 generates a search query to include particular parameter fields, and each parameter field corresponds to one of the predetermined slots in the slot database 166. The processor 128 uses the identified slot words from the slot decoder 144 that are assigned to slots using the slot classifier 138 as fields to execute the query. The slot-filling operation enables the system 100 to translate the natural language input from the user into a machine-understandable command, which is a database query in this example, where system 100 identifies the slot words to enable an automated response to the natural language input with improved accuracy.

The embodiments described herein enable improvements to identifying slot words for slot-filling operations in SLU systems. In particular, the system 100 provides improvements to the combined precision (P) and recall (R) of the slot assignment process that is expressed using the F1 metric. The F1 metric is a weighted average of the precision (P) and recall (R) scores on a predetermined scale, such as a scale of 0.0 (worst) to 100.0 (best), although the F1 metric is also often expressed on a scale of 0.0 to 1.0. Table 2 depicts the results of slot value prediction with varying training size and OOV ratio of a convolutional neural network (CNN), a prior-art RNN encoder/decoder framework with an attention mechanism (Seq2Seq) and the system 100 that performs the process 300:

TABLE 2

Slot value prediction results with varying training size and OOV ratio

| | | Training Size | | | |
|---|---|---|---|---|---|
| | | 5% | 10% | 15% | 20% |
| | | OOV Ratio | | | |
| | | (16%) | (12%) | (4%) | (2%) |
| CNN | P | 91.6 | 93.0 | 92.7 | 93.4 |
| (prior art) | R | 61.7 | 62.5 | 65.8 | 69.2 |
| | F1 | 73.7 | 74.8 | 77.0 | 79.5 |
| Seq2Seq | P | 81.3 | 83.6 | 84.1 | 85.3 |
| w/attention | R | 69.6 | 74.7 | 74.9 | 76.5 |
| (prior art) | F1 | 75.0 | 78.9 | 79.2 | 80.7 |
| System 100 | P | 86.9 | 86.4 | 85.7 | 85.9 |
| | R | 73.2 | 75.3 | 77.0 | 77.4 |
| | F1 | 79.5 | 80.5 | 81.1 | 81.4 |

As depicted in Table 2 above, the F1 scores show the highest values for the system 100 over a wide range of training set sizes with different ratios of the input words being considered out-of-vocabulary. The system 100 uses both the RNN encoder/decoder framework and the pointer network to improve the overall results that balance both precision and recall. As shown above, in some instances, the prior-art CNN shows greater precision P but the level of recall R of the prior-art CNN system is substantially lower than the system 100, and the total F1 scores for the system 100 are higher than either the CNN or Seq2Seq prior-art embodiments. As such, the embodiments described herein including the system 100 and the process 300 each provides improvements to the operation of computers that are used to implement SLU systems.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operation of a spoken language understanding (SLU) system comprising:
   receiving, with a processor in the SLU system, an input sequence including a plurality of words in a text phrase;
   generating, with the processor, an encoded output corresponding to the plurality of words and a plurality of attention weights corresponding to the plurality of words using a recurrent neural network (RNN) encoder with an attention mechanism that receives the plurality of words as inputs to the RNN encoder;
   generating, with the processor, a first probability distribution corresponding to a plurality of words in an extended slot vocabulary database being a slot word at a time step using an RNN decoder that receives the encoded output from the RNN encoder as input;
   generating, with the processor, a second probability distribution corresponding to the plurality of words in the input sequence being a slot word at the time step using a pointer network that receives the plurality of attention weights as input;
   generating, with the processor, a combined probability distribution based on the first probability distribution and the second probability distribution;
   identifying, with the processor, a slot word corresponding to one word in the extended slot vocabulary database having a highest probability value in the combined probability distribution for the time step; and
   performing, with the processor, a command using the slot word as a parameter to the command.

2. The method of claim 1, the generating of the combined probability distribution further comprising:
   generating, with the processor, a weight value based on a state of the RNN decoder; and
   generating, with the processor, the combined probability distribution as weighted sum of the first probability distribution and the second probability distribution using the weight value.

3. The method of claim 2 further comprising:
   generating, with the processor, the weight value as $p_t$ at the time step t based on the following function $p_t = \sigma(w_c c_t + w_s s_t + w_d d_t + b)$
   where $c_t$ is a context vector of the attention mechanism,
   $s_t$ is a a is a hidden state value of the RNN decoder,
   $d_t$ is an input to the RNN decoder,
   $w_c$, $w_s$, and $w_d$, are a plurality of trainable weight values, and
   b is a bias term.

4. The method of claim 3 further comprising:
   generating, with the processor, the combined probability distribution including a probability value P(w) where w is a word in the plurality of words in the extended slot vocabulary database based on the following function:

$P(w) = P_t P_{gen}(w) + (1 - p_t) P_{ptr}(w),$ where $P_{gen}$ is the first probability distribution, and $P_{ptr}$ is the second probability distribution.

5. The method of claim 2 wherein the processor generates the weight value to favor the first probability distribution generated by the RNN decoder in response to the first word being an in-vocabulary word and the processor generates the weight value to favor the second probability distribution generated by the pointer network in response to the first word being an out-of-vocabulary word.

6. The method of claim 1 wherein the RNN encoder is a bi-directional RNN encoder.

7. The method of claim 6 wherein the RNN encoder includes at least two gated recurrent units.

8. The method of claim 7 wherein the RNN decoder includes at least one gated recurrent unit.

9. The method of claim 6 wherein the RNN decoder is a uni-directional RNN decoder.

10. The method of claim 1 further comprising:
    generating, with the processor, the plurality of words in the text phrase using an automated speech recognition engine based on audio data received using an audio input device.

11. A system for spoken language understanding comprising:
    an input device;
    an output device;
    a memory; and
    a processor operatively connected to the input device, the output device, and the memory, the processor being configured to:
    receive an input sequence including a plurality of words in a text phrase based on an input received with the input device;
    generate an encoded output corresponding to the plurality of words and a plurality of attention weights corresponding to the plurality of words using a recurrent neural network (RNN) encoder with an attention mechanism stored in the memory that receives the plurality of words as inputs to the RNN encoder;
    generate a first probability distribution corresponding to a plurality of words in an extended slot vocabulary database stored in the memory being a slot word at a time step using an RNN decoder stored in the memory that receives the encoded output from the RNN encoder as input;
    generate a second probability distribution corresponding to the plurality of words in the input sequence being a slot word at the time step using a pointer network that receives the plurality of attention weights as input;
    generate a combined probability distribution based on the first probability distribution and the second probability distribution;
    identify a slot word corresponding to one word in the extended slot vocabulary database having a highest probability value in the combined probability distribution for the time step; and
    perform a command using the slot word as a parameter to the command to produce an output with the output device.

12. The system of claim 11, the processor being further configured to:

generate a weight value based on a state of the RNN decoder; and generate the combined probability distribution as weighted sum of the first probability distribution and the second probability distribution using the weight value.

13. The system of claim 12, the processor being further configured to:

generate the weight value as $p_t$ at the time step t based on the following function $P_t = \sigma(w_c c_t + w_s s_t + w_d d_t + b)$ where $c_t$ is a context vector of the attention mechanism, $s_t$ is a is a hidden state value of the RNN decoder, $d_t$ is an input to the RNN decoder, $w_c$, $w_s$, and $w_d$, are a plurality of trainable weight values, and b is a bias term.

14. The system of claim 13, the processor being further configured to:

generate the combined probability distribution including a probability value P(w) where w is a word in the plurality of words in the extended slot vocabulary database based on the following function:

$P(w) p_t P_{gen}(w) + (1-p_t) P_{ptr}(w)$, where $P_{gen}$ is the first probability distribution, and $P_{ptr}$ is the second probability distribution.

15. The system of claim 12, the processor being further configured to generate the weight value to favor the first probability distribution generated by the RNN decoder in response to the first word being an in-vocabulary word and the processor generates the weight value to favor the second probability distribution generated by the pointer network in response to the first word being an out-of-vocabulary word.

16. The system of claim 11 wherein the RNN encoder is a bi-directional RNN encoder.

17. The system of claim 16 wherein the RNN encoder includes at least two gated recurrent units.

18. The system of claim 17 wherein the RNN decoder includes at least one gated recurrent unit.

19. The system of claim 16 wherein the RNN decoder is a uni-directional RNN decoder.

20. The system of claim 11, the input device further comprising:

an audio input device; and the processor being further configured to generate the plurality of words in the text phrase using an automated speech recognition engine based on audio data received using the audio input device.

* * * * *

UNITED STATES PATENT AND TRADEMARK OFFICE
CERTIFICATE OF CORRECTION

PATENT NO. : 10,770,066 B2
APPLICATION NO. : 16/057521
DATED : September 8, 2020
INVENTOR(S) : Zhao et al.

Page 1 of 1

It is certified that error appears in the above-identified patent and that said Letters Patent is hereby corrected as shown below:

In the Claims

In Claim 14, at Column 17, Line 23:
"$P(w)p_t P_{gen}(w) + (1 - p_t)P_{pt\,r}(w),$"
Should read:
--$P(w) = p_t P_{gen}(w) + (1 - p_t)P_{ptr}(w),$--.

Signed and Sealed this
Fifteenth Day of December, 2020

Andrei Iancu
*Director of the United States Patent and Trademark Office*